INVENTOR.
ERNEST P. MOSLO

Aug. 8, 1961 E. P. MOSLO 2,995,117
REGENERATIVE CIRCUIT FOR FLUID ACTUATED MOTOR
Filed Dec. 1, 1959 3 Sheets-Sheet 2

INVENTOR.
ERNEST P. MOSLO
BY
Meyer, Baldwin, Doran, Young
ATTORNEYS

Aug. 8, 1961 E. P. MOSLO 2,995,117
REGENERATIVE CIRCUIT FOR FLUID ACTUATED MOTOR
Filed Dec. 1, 1959 3 Sheets-Sheet 3
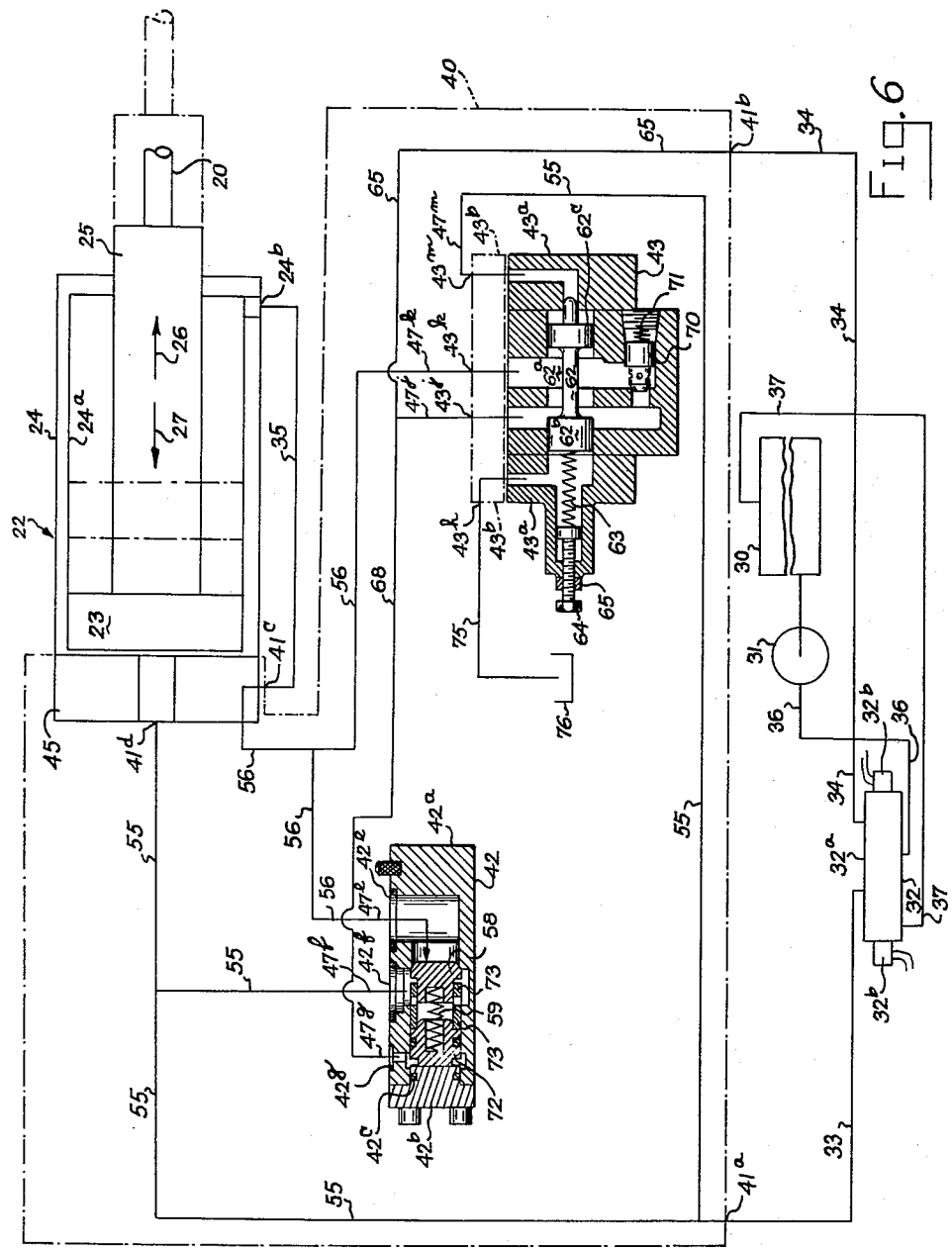
INVENTOR.
ERNEST P. MOSLO
BY
ATTORNEYS

United States Patent Office 2,995,117
Patented Aug. 8, 1961

2,995,117
REGENERATIVE CIRCUIT FOR FLUID
ACTUATED MOTOR
Ernest P. Moslo, % Moslo Machinery Co.,
2443 Prospect Ave., Cleveland, Ohio
Filed Dec. 1, 1959, Ser. No. 856,421
5 Claims. (Cl. 121—45)

This invention relates to improvements in a control for a fluid actuated motor and more particularly to a regenerative circuit for a fluid pressure powered cylinder and piston motor adapted for use on a plastic molding machine.

One of the objects of the present invention is to provide a single unit, easily attachable in place of the usual cylinder head on a fluid pressure powered cylinder motor on any suitable machine, such as on such motor on a plastic molding machine.

A further object of the present invention is to provide a unit of a regenerative circuit for a fluid actuated motor wherein said unit includes a conduit manifold for securing together structurally and in fluid communication the valves of this unit.

A further object of the present invention is to provide a unit of a regenerative circuit for a fluid actuated motor wherein the unit contains only two valves.

A further object of the present invention is to provide a unit of a regenerative circuit for a fluid actuated motor wherein said unit is characterized by its inexpensive manufacturing cost, structural simplicity, ease of assembly of its component parts, operating efficiency, multiplicity of functional advantages for some component parts, and ease of adaptation and mounting on a conventional fluid powered cylinder motor.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 5 is a vertical, transverse sectional view taken along the line 5—5 in FIG. 2 through the unit; while FIG. 6 is a flow diagram of the regenerative circuit and fluid actuated motor shown in FIG. 1.

Before the plastic molding machine and regenerative circuit therefor here illustrated is specifically described, it is to be understood that the invention here involved is not limited to the structural details or arrangement of parts here shown since the unit in the regenerative circuit embodying the present invention may take various forms. It is also to be understood that the phraseology or terminology herein employed is for purposes of description and not of limitation since the scope of the present invention is denoted by the appended claims.

While the present invention might be adapted to various types of machines or uses, it has been chosen to show the same as applied to the injection system for feeding plastic to a die in a plastic molding machine.

Figure 1:
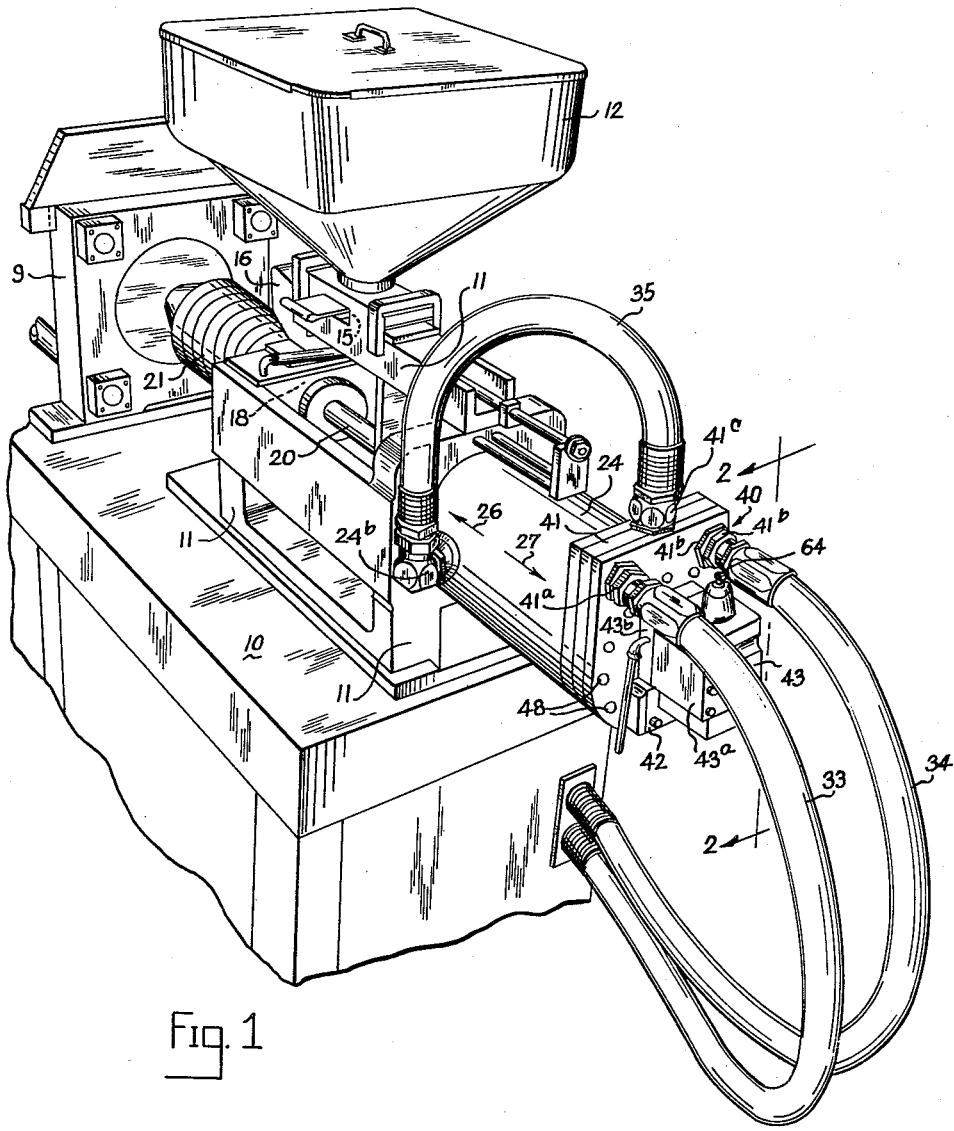
FIG. 1 is a perspective view of the injection end of a plastic molding machine having a fluid pressure powered cylinder motor for feeding plastic to the die thereof and having a regenerative circuit with my improved single unit attached in place of the cylinder head on the outer end of the cylinder.
Figure 3:
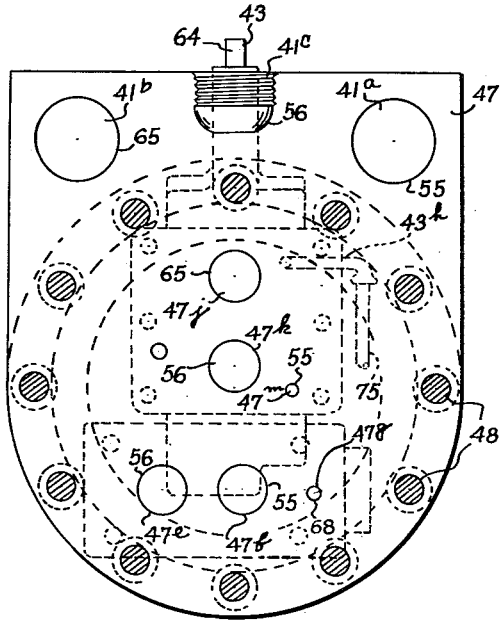
FIG. 3 is a vertical, transverse sectional view taken along the line 3—3 in FIG. 2 through the unit.

Although the disclosed invention may be carried out utilizing any suitable injection molding machine, one suitable machine has been partially shown in FIG. 1 for carrying out the invention. This comprises a base 10 to which is fixed a die 9 having a plurality of die plates with at least one of these plates being movable by a conventional fluid powered cylinder motor (not shown) driving a conventional toggle linkage (not shown) from a mold open to a mold closed position, wherein a cavity is formed for an article to be molded. This machine operates in a conventional manner. Solid plastic in a finely divided form is fed from main hopper 12, secured to base 10 by frame 11, through pusher chamber 15 to transfer hopper 16 where it drops by gravity into chamber 18 in frame 11 just ahead of ram 20. This ram 20, movable endwise through aligned holes in frame 11, pushes or feeds the solid, finely divided, synthetic resin material from chamber 18 into the hollow heating chamber or plasticizing head 21 wherein it gradually becomes flowable and is brought up to a suitable temperature for injection molding into the die cavity as it flows in the upper leftward direction in FIG. 1 toward the exit end of chamber 21 and enters the die cavity in die 9.

Ram 20 is driven by a double acting, fluid pressure powered cylinder motor 22 in FIGS. 1 and 6. This motor 22 has a cylinder 24 rigidly mounted on frame 11 and having a bore 24a within which piston head 23 is adapted to move axially in opposite directions, including a feeding or advancing direction 26 and a return direction 27. Piston head 23 has rigidly secured thereto a piston rod 25 in FIG. 6 extending away from head 23 in this advancing direction 26 and rigidly secured to ram 20. It should be apparent that as pressure fluid is supplied to cylinder 24 in FIG. 6 to the left side of head 23, and is exhausted from the right side of the head, by suitable controls, piston head 23 will move in the advancing direction 26 to force material by ram 20 through heating chamber 21 into the mold cavity in the usual manner. When the flow in cylinder 24 is reversed, piston head 23 will move in the returning or retraction stroke 27 to position ram 20 for the next feeding stroke.

The fluid flow circuit for powering and controlling this motor 22 is shown in FIG. 1 and 6. This circuit includes a hydraulic fluid reservoir 30; fluid pump 31 or other suitable fluid pressure source; a conventional directional valve known as a double solenoid controlled pilot operated four way valve 32 having in valve body 32a an endwise slidable valve spool, movable endwise in opposite directions, moved to advancing position by energizing one of its solenoids 32b and moved to return position by energizing its other solenoid 32b; and flow conduits 33, 34 and 35 connected at their ends by suitable flow fittings to other portions of the apparatus. If desired, a conventional manually actuable four way valve may be substituted for valve 32.

Although this circuit could be used for any fluid powered motor, including the aforementioned die plate moving motor, it has been chosen to disclose the circuit with motor 22 providing on a plastic molding machine the plastic injection action. Although any fluid could be used (such as air, gas or liquid), hydraulic fluid, such as oil, is preferred and will be mentioned hereinafter. Although the control is described for a double acting cylinder, it should be readily apparent that some features of the control are useable with not only a double acting motor but also any single acting motor, such as a two speed, single acting motor for moving rod 20 in advancing direction 26, while other suitable means are provided for the return action in direction 27.

Figure 2:
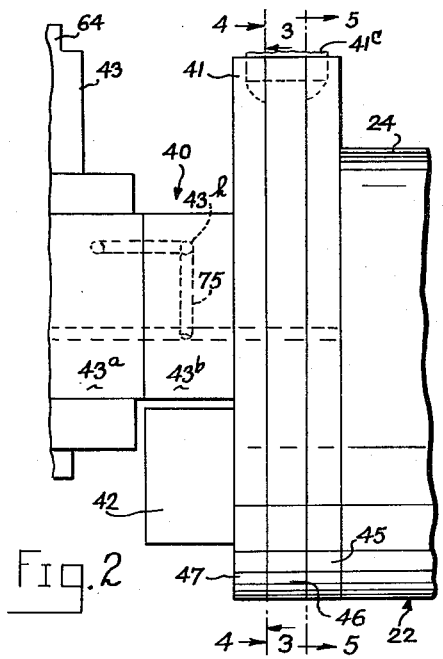
FIG. 2 is a side elevational view of a portion of the unit taken generally along the line 2—2 in FIG. 1.
Figure 4:
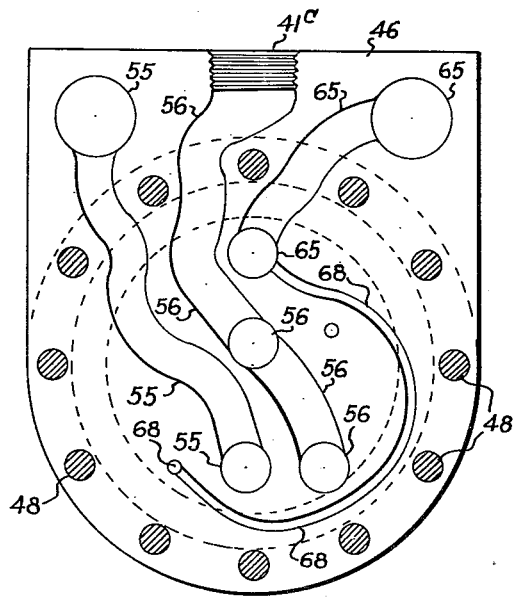
FIG. 4 is a vertical, transverse sectional view taken along the line 4—4 in FIG. 2 through the unit.
Figure 5:
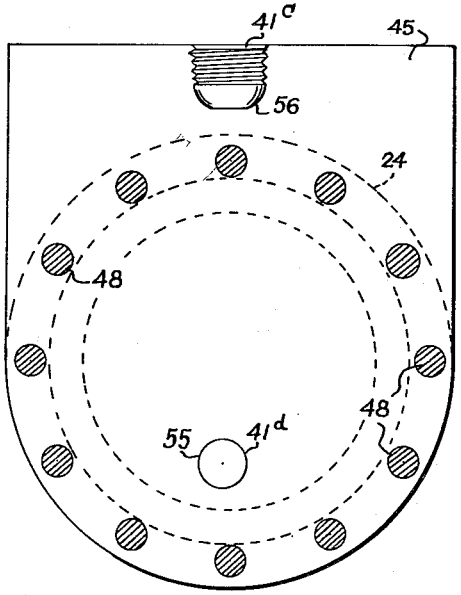

This fluid circuit also includes in FIGS. 1 and 2 a single unit 40, shown schematically as a dot-dash line box in FIG. 6, which unit is secured to one end of cylinder 24 as a cylinder head in place of the conventional cylinder head for this type of fluid pressure powered cylinder motor. This unit 40 includes a remotely controlled, fluid operated, resiliently closed check valve 42; a remotely controlled, externally drained, sequence and check valve 43; and a plate-like conduit manifold 41 serving as a conduit means operatively connecting these two valves together not only in fluid communication but also into a structurally rigid, single unit.

Manifold 41 may be a drilled type or brazed sandwich type manifold with the latter type being shown in detail here as one suitable form. Manifold 41 has in FIGS. 2–5 a laminated manifold structure of a plurality of heavy metal plates or impervious sheet material members 45, 46 and 47 joined in surface sealed bonded engagement in any suitable manner, such as by brazing or the like. It has been found that bonding the surfaces together by hydrogen furnace brazing seals together all contiguous surface points and enables high fluid pressures to be suitably confined and conveyed while eliminating oxidization and scale.

Unit 40 is attached to cylinder 24 by a plurality of circumferentially spaced bolts 48 having their bolt heads recessed in plate 47, extending through manifold 41, and screwed into threaded holes in the wall of cylinder 24 in the same manner as bolt heads mounting the conventional cylinder head.

A simple and inexpensive construction is provided by this manner of mounting manifold 41 on cylinder 24 and by using only two valves 42 and 43, as shown in the drawings.

Although this is the simplest and preferred manner of mounting manifold 41, it should be readily understood that if the manifold were mounted on some other portion of the machine with a suitable conduit leading to a conventional cylinder head, the regenerative circuit would work in generally the same manner, as will be apparent hereinafter.

Valves 42 and 43 are rigidly mounted on the outer or left hand surface of plate 47 in (FIG. 2) of manifold 41 by being secured by bolts extending through these valves and screwed into plate 47. To permit compact design and avoid interference between the parts, valve 43 includes a main valve body 43a and a valve spacer block 43b rigidly connected together by these bolts with block 43b having three straight through passageways and one right angular passageway in this block 43b aligned with the ports in valve body 43a in FIG. 6 and providing in valve block 43b valve ports 43j, 43k and 43m and valve port 43h respectively. Valve 42 includes valve body 42a, O-ring 42c and cap 42b secured together by suitable screws.

Manifold 41 and valves 42 and 43 have a plurality of ports in FIGS. 1, 3, 5 and 6. Manifold 41 has two pressure source ports 41a and 41b, cylinder rod end port 41c, and cylinder head end port 41d. Ports 41a and 41b are connected in flow communication by flow conduits 33 and 34 with the fluid pressure source or pump 31 through control valve 32, port 41c is connected in flow communication by flow conduit 35 through cylinder rod end port 24b with the interior bore 24a of cylinder 24 on the right side of piston head 23 in FIG. 6, and port 41d is connected in flow communication with the left side of piston head 23. Valve 42 has in FIG. 6 valve ports 42e, 42f and 42g. Valve 43 has in valve spacer block 43b of valve 43 valve ports 43j, 43k and 43m. These valves 42 and 43 are secured to the outer surface of plate 47 of the manifold 41 with these ports directly aligned and in flow communication respectively with manifold ports 47e, 47f, 47g, 47j, 47k and 47m in FIGS. 3 and 6.

Movement of fluid motor 22 through a full cycle, including a full feeding stroke in advancing direction 26 and a full return stroke in returning direction 27, includes four distinct steps and distinct fluid paths.

First, piston head 23 will move in advancing direction 26 when four way valve 32 is moved to advancing position by energizing the aforesaid one solenoid 32b to supply fluid under pressure from pump 31 through conduit 36, valve 32, and flow conduit 33 to source port 41a. As will later appear, valve 32 is also now adjusted to convey exhausting fluid from port 41b through flow conduit 34, valve 32, and conduit 37 to reservoir 30. Then, fluid under pressure from source pump 31 will enter source port 41a in FIGS. 1, 3 and 6 to travel through passageway 55 in FIGS. 3, 4, 5 and 6 in plates 47, 46 and 45; and head end port 41d in FIGS. 5 and 6 to enter into cylinder bore 24a at the left side and to push against the left side of piston head 23 to move it in advancing direction 26 in response to the fluid under pressure being supplied by pump 31.

Second, the regenerative feature of the circuit makes piston head 23 move at fast or high speed during the first portion of its travel in advancing direction 26. This high speed is obtained by taking the oil or hydraulic fluid exhausting through cylinder rod end port 24b during head movement in direction 26, which exhausting fluid is usually returned to reservoir tank 30 through flow conduit 34, and adding this exhausting fluid to the fluid traveling from source port 41a through passageway 55 into head end port 41d to move piston head 23 in direction 26 so as to speed up the movement of the head 23 in this direction by increasing the fluid volume entering head end port 41d. This result is possible because of the difference in cross sectional areas exposed to the fluid on opposite sides of the piston head 23 since piston rod 25 is of substantial diameter. The greater area on the left side of the piston head 23 in FIG. 6 permits fluid to exert a greater force on piston head 23 than the fluid on the right hand side of piston head 23 so that movement takes place in direction 26 even though the pressure of the fluid on the left hand side of the piston head 23 is less than the pressure of the fluid on the right hand side. It has been found that best regeneration operation is obtained by having the cross sectional area of piston rod 25 approximately half of the cross sectional area of piston head 23. If the area of rod 25 is smaller, the return speed in direction 27 is substantially slower. If the rod area is larger, not enough fluid is exhausted through cylinder port 24b to increase the speed of the advance in direction 26 during the regenerative cycle. As the fluid is exhausted through cylinder rod end port 24b under pressure from cylinder 24 by the movement of piston head 23 in advancing direction 26, this exhausting fluid travels through conduit 35 into rod end port 41c in FIGS. 1 to 6 and through passageway 56 in FIGS. 3, 4 and 6 in plates 45, 46 and 47; port 47e in FIGS. 3 and 6 in plate 47; valve port 42e in FIG. 6 in valve 42; check valve in valve 42 in FIG. 6 (check valve head 58 of this check valve being normally resiliently biased to a closed position by check valve spring 59 in valve 42) opened when fluid pressure on the cylinder rod end is greater than on the cylinder head end; valve port 42f; port 47f in plate 47; passageway 55 in FIGS. 4–6 in plates 47, 46 and 45; and head end port 41d so that this fluid, exhausted from port 24b, now exhausts through head end port 41d for increasing the supply of fluid emerging from this head end port 41d to make piston head 23 move at high speed in advancing direction 26. Check valve head 58 assures that: (1) fluid from pump 31 cannot enter cylinder 24 through rod end port 24b to move head 23 in direction 27, and (2) the regenerative fluid from the rod end port 24b will reach sufficient pressure, greater than the pressure of the fluid from pump 31 in passageway 55, so that it can enter head end port 41d through passageway 55. Hence, this second or regeneration step takes place automatically in response to fluid being exhausted under pressure from rod end port 24b.

This fluid exhausted from rod end port 24b cannot now exhaust through source port 41b back through valve 32 to reservoir 30 because this flow line is cut off by valve 43 in FIG. 6 as follows. Fluid cannot exhaust from passageway 56 in FIGS. 3, 4 and 5 through valve port 47k in FIGS. 3 and 6 because pilot piston or spool 62 of valve 43 in FIG. 6 is biased to its right hand position (the left hand position is shown in FIG. 6) by valve spring 63 until its spool head 62c is bottomed against valve body 43a so that its spool head 62b and closed check valve head 70 prevent the fluid entering port 43k from leaving through valve port 43j.

This second step provides rapid traverse at high speed in advancing direction 26 during this portion of the ram stroke for packing the material by ram 20 when little resistance is encountered by ram 20. Near the end of this stroke in direction 26, when the plastic material becomes compacted and resistance to ram travel becomes greater, the regenerative or second step is automatically stopped and ram 20 automatically moves at slow speed to exert a greater force to overcome the greater resistance encountered during injection of the plastic material into the mold cavity, as explained hereafter. This two speed operation permits the plastic molding machine to have a high production rate and to operate at maximum speed during each stage of the injection operation.

Third, piston head 23 moves the remaining portion of its travel distance in advancing direction 26 at slow speed to complete the injection operation. As piston head 23 moves in direction 26 at high speed in this second or regenerative step, ram 20 and piston head 23 encounter a greater movement resistance force. When this force becomes a predetermined value, the second step stops or is deenergized and the third step begins automatically in response to this predetermined force. This increase in force causes an increase in fluid pressure in passageway 55 to be reflected by the fluid through port 47m in FIGS. 3 and 6 in plate 47, and remote pressure control valve port 43m in valve 43 in FIG. 6 so as to exert greater force against the right end of pilot piston or spool 62 in FIG. 6 to move it in the leftward direction against the bias of spring 63 to the illustrated left hand position in FIG. 6 when the predetermined resistance force, equivalent to the setting of valve spring 63, has been encountered. This predetermined force may be changed by turning pressure adjustment screw 64 to change the force exerted by valve spring 63 and then locking screw 64 in its new position by jam nut 65. Now, the fluid exhausting through cylinder rod end port 24b travels back to tank 30, instead of to head end port 41d, by traveling from port 24b through flow conduit 35, cylinder rod end port 41c in FIGS. 1–6 of manifold 41; passageway 56; port 47k in plate 47; valve port 43k in valve 43; axially along neck 62a of pilot piston or spool 62; valve port 43j in valve 43; port 47j in plate 47; passageway 65 in (FIGS. 3, 4 and 6) plates 46 and 47; source port 41b in FIGS. 1, 3 and 6; flow conduit 34; valve 32; and conduit 37 to reservoir 30. Also, spring 59 in valve 42 in FIG. 6 moves check valve head 58 to the right to closed position to prevent flow from rod end port 24b back into cylinder 24 through port 41d, as had occurred in the second or regenerative step. Now, the fluid is flowing, in the manner mentioned in the first step, from port 41a through passageway 55 into port 41d, and this fluid continues to flow in this manner to move piston head 23 the remaining portion of its travel distance in advancing direction 26 at slow speed. Ram 20 now exerts a greater force than it did during the second step because piston head 23 is moving at a slower speed and the full fluid pressure force exerted against the left face of piston head 23 in FIG. 6 is used to move the piston rod 25 in direction 26 instead of having a portion of this force being used to compress the fluid on the right hand side of the piston head up to the pressure of the fluid in passageway 55 so as to overcome the force of spring 59 in valve 42.

Fourth, after the injection stroke in advancing direction 26 has been completed, the return solenoid (the aforesaid other solenoid 32b) in four way valve 32 is energized by a suitable electrical control system to move the sliding valve spool in valve 32 to its return position to reverse the direction of flow in flow conduits 33 and 34 so as to supply fluid under pressure through conduit 34 to rod end ports 41c and 24b for moving piston head 23 in return direction 27 while exhausting fluid from cylinder 24 through head end port 41d, passageway 55, and conduit 33 to tank 30. This action takes place automatically in response to fluid under pressure from source pump 31 entering source port 41b to supply this piston head moving fluid for port 24b. This fluid flow is from reservoir 30 into rod end port 24b through pump 31; conduit 36; four-way valve 32; flow conduit 34; source port 41b; passageway 65; ports 47j and 43j; the passageway in valve 43 around piston head 62b (valve piston 62 is now in its right hand position with valve spring 63 pushing valve piston head 62c into bottomed position against valve body 43a since pressure is not in conduit 55); open check valve in valve 43, opened by the pressure of this reverse flow but normally closed by check valve spring 71 urging check valve head 70 toward the left in FIG. 6 into its closed position; the space around piston neck 62a; ports 43k and 47k; passageway 56; and rod end ports 41c and 24b into cylinder 24 to push against the right hand side of piston head 23 to move it in return direction 27. The flow at the left hand side of piston head 23 is returned to reservoir 30 by traveling from cylinder bore 24a through head end port 41d, passageway 55, source port 41a flow conduit 33, four-way valve 32, and conduit 37 to tank 30. The fluid from pump 31 cannot return to tank 30 by by-passing cylinder 24. The fluid cannot by-pass cylinder 24 by traveling from passageway 56 to passageway 55 through valve 42 because check valve head 58 in valve 54 is held in closed position and is remotely controlled by the fluid pressure from pump 31. The fluid pressure in passageway 65 is reflected through passageway 68 in FIGS. 3, 4 and 6 in plates 46 and 47; port 47g in plate 47; valve port 42g in valve 42; and the left face of control head 72 in valve 42 to urge axially its perforated control sleeve 73 toward the right in FIG. 6 to increase the force exerted on check valve head 58 by check valve spring 59 and to cause control sleeve 73 to firmly press check valve head 58 against its seat to maintain it in closed position. Check valve head 58 will not be unseated by the pressure in passageway 56 because this pressure is less than the pressure in passageway 68 since the force of check valve spring 71 in valve 43 must be overcome to unseat check valve head 70 during the fluid flow action.

Valve 43 is preferably externally drained, as shown in FIG. 6, through valve drain port 43h in valve block 43b and through conduit 75 to suitable external tank 76 or back to reservoir 30.

Now it should be apparent that single unit 40 has a simple construction with only two valves 42 and 43, and a multi-purpose manifold 41 for rigidly mounting these valves, providing the cylinder head for cylinder 24, providing all passageways and conduits except fluid conduits 33, 34 and 35 so as to provide simplified piping with substantially no flow lines needing to be connected during installation of unit 40 onto a machine; and providing head end port 41d for the cylinder 24.

It is easy to convert a single speed injection stroke motor into a two speed motor having the aforedescribed regenerative cycle. In a conventional motor, similar to motor 22, the double acting, fluid pressure powered cylinder 24 has a conventional cylinder head attached thereto by bolts, similar to bolts 48; flow conduit 33 connected by a suitable fitting to one end of the head to supply fluid through a passageway extending through the head into a cylinder head end port, similar to port 41d in FIG. 6; and flow conduits 34 and 35 united together as a single, integral flow conduit to supply fluid from valve 32 to rod end port 24b. To install the single, preassembled unit 40, one needs merely to detach the bolts to remove this conventional cylinder head, remove the conventional cylinder head and attach unit 40 in place thereof by bolts 48, remove flow conduit 33 from the conventional cylinder head and attach it to port 41a, cut the one piece conduit from valve 32 to port 24b intermediate its ends to form flow conduits 34 and 35, and attach these cut ends respectively to ports 41b and 41c. Unit 40, sold as a preassembled single unit, can be installed in this manner in approximately one hour. No machining or fitting of parts is required; no complex piping system must be connected. Unit 40 is easily installed with a minimum of effort to convert a single speed, low production plastic molding machine into a two speed, high production plastic molding machine.

Various changes in details and arrangement of parts can be made by one skilled in the art without departing from either the spirit of this invention or the scope of the appended claims.

What is claimed is:

1. A single unit attachable in place of a cylinder head on a fluid pressure powered cylinder motor adapted for feeding plastic to a die in a plastic molding machine wherein said cylinder has a piston head movable in opposite directions in a feeding or advancing direction and in a return direction with said piston head having a piston rod extending in said advancing direction, said unit comprising a pressure source port, a cylinder rod end port, and a cylinder head end port for connection in flow communication respectively with said fluid pressure source and the interior of said cylinder on opposite sides of said piston head; including means for attaching said unit to said cylinder in place of a cylinder head; and including a first means responsive to fluid under pressure from said source entering said source port for supplying fluid under pressure through said head end port for moving said piston head in said advancing direction, a second means responsive to fluid exhausted under pressure from said cylinder into said rod end port by piston head movement in said advancing direction for increasing the supply of fluid emerging from said head end port to make said piston head move at high speed during the first portion of its travel in said advancing direction, and a third means responsive to a predetermined movement resistance force encountered by piston head travel in said advancing direction for deenergizing said second means while said first means supplies fluid to said head end port for moving said piston head the remaining portion of its travel distance in said advancing direction at slow speed.

2. A unit useable with a fluid pressure powered cylinder motor adapted for feeding plastic to a die in a plastic molding machine with said motor having a cylinder having therein a piston head movable in opposite directions in a feeding or advancing direction and in a return direction with said piston head having a piston rod extending in said advancing direction, said unit consisting of a plate-like conduit manifold having a plurality of ports, means for detachably mounting said manifold in fixed relation relative to said cylinder, and a plurality of valves, each of said valves having ports and being rigidly mounted on said manifold with at least some of said valve ports directly aligned and in flow communication with some of said manifold ports; said aforementioned ports comprising a pressure source port, a cylinder rod end port, and a cylinder head end port for connection in flow communication respectively with said fluid pressure source and the interior of said cylinder on opposite sides of said piston head; said unit including a first means responsive to fluid under pressure from said source entering said source port for supplying fluid under pressure through said head end port for moving said piston head in said advancing direction, a second means responsive to fluid exhausted under pressure from said cylinder into said rod end port by piston head movement in said advancing direction for increasing the supply of fluid emerging from said head end port to make said piston head move at high speed during the first portion of its travel in said advancing direction, and a third means responsive to a predetermined movement resistance force encountered by piston head travel in said advancing direction for deenergizing said second means while said first means supplies fluid to said head end port for moving said piston head the remaining portion of its travel distance in said advancing direction at slow speed.

3. A unit useable with a double acting fluid pressure powered cylinder motor adapted for feeding plastic to a die in a plastic molding machine with said motor having a cylinder having therein a piston head movable in opposite directions in a feeding or advancing direction and in a return direction with said piston head having a piston rod extending in said advancing direction, said unit consisting of two valves and conduit means operatively connecting said two valves; said valves and conduit means having ports comprising two pressure source ports, a cylinder rod end port, and a cylinder head end port for connection in flow communication respectively with said fluid pressure source and the interior of said cylinder on opposite sides of said piston head; said unit including a first means responsive to fluid under pressure from said source entering one of said source ports for supplying fluid under pressure through said head end port for moving said piston head in said advancing directon, a second means responsive to fluid exhausted under pressure from said cylinder into said rod end port by piston head movement in said advancing direction for increasing the supply of fluid emerging from said head end port to make said piston head move at high speed during the first portion of its travel in said advancing direction, a third means responsive to a predetermined movement resistance force encountered by piston head travel in said advancing direction for deenergizing said second means while said first means supplies fluid to said head end port for moving said piston head the remaining portion of its travel distance in said advancing direction at slow speed, and a fourth means responsive to fluid under pressure from said source entering the other of said source ports for supplying fluid under pressure through said rod end port for moving said piston head in said return direction.

4. A unit useable with a double acting fluid pressure powered cylinder motor adapted for feeding plastic to a die in a plastic molding machine with said motor having a cylinder having therein a piston head movable in opposite directions in a feeding or advancing direction and in a return direction with said piston head having a piston rod extending in said advancing direction, said unit comprising a plurality of valves and conduit means operatively connecting said valves; said valves and conduit means having ports comprising two pressure source ports, a cylinder rod end port, and a cylinder head end port for connection in flow communication respectively with said fluid pressure source and the interior of said cylinder on opposite sides of said piston head; said unit including a first means responsive to fluid under pressure from said source entering one of said source ports for supplying fluid under pressure through said head end port for moving said piston head in said advancing direction, a second means responsive to fluid exhausted under pressure from said cylinder into said rod end port by piston head movement in said advancing direction for exhausting this last mentioned fluid through said head end port for increasing the supply of fluid emerging from said head end port to make said piston head move at high speed during the first portion of its travel in said advancing direction, a third means responsive to a predetermined movement resistance force encountered by piston head travel in said advancing direction for deenergizing said second means while said first means supplies fluid to said head end port for moving said piston head the remaining portion of its travel distance in said advancing direction at slow speed, and a fourth means responsive to fluid under pressure from said source entering the other of said source ports for supplying fluid under pressure through said rod end port for moving said piston head in said return direction; at least one of said valves including a resiliently closed check valve constructed to be opened by said fluid entering said rod end port from said cylinder during movement in said advancing direction so that said last mentioned fluid exhaust through said head end port and constructed to be held closed by the fluid under pressure entering said other source port.

5. In combination, a double acting fluid pressure powered cylinder motor; said motor including a cylinder, and a piston head movable within said cylinder in opposite directions in an advancing direction and in a return direction with said piston head having a piston rod extending in said advancing direction; a single unit secured to one end of said cylinder as a cylinder head, said unit consisting of a plate-like conduit manifold having a plurality of ports, means for detachably mounting said manifold on said cylinder as said cylinder head, and two valves, each of said valves having ports and being mounted on said manifold with at least some of said valve ports directly aligned and in flow communication with some of said manifold ports; said aforementioned ports comprising two pressure source ports, a cylinder rod end port and a cylinder head end port connected in flow communication respectively with said fluid pressure source and the interior of said cylinder on opposite sides of said piston head; said two valves and manifold of said unit including a first means responsive to fluid under pressure from said source entering one of said source ports for supplying fluid under pressure through said head end port for moving said piston head in said advancing direction, a second means responsive to fluid exhausted under pressure from said cylinder into said rod end port by piston head movement in said advancing direction for exhausting this last mentioned fluid through said head end port for increasing the supply of fluid emerging from said head end port to make said piston head move at high speed during the first portion of its travel in said advancing direction, a third means responsive to a predetermined movement resistance force encountered by piston head travel in said advancing direction for deenergizing said second means while said first means supplies fluid to said head end port for moving said piston head the remaining portion of its travel distance in said advancing direction at slow speed, and a fourth means responsive to fluid under pressure from said source entering the other of said source ports for supplying fluid under pressure through said rod end port for moving said piston head in said return direction; one of said valves including a resiliently closed check valve constructed to be opened by said fluid entering said rod end port from said cylinder during movement in said advancing direction so that said last mentioned fluid exhausts through said head end port and constructed to be held closed by the fluid under pressure entering said other source port; the other of said valves being a remotely controlled, sequence and check valve.

References Cited in the file of this patent
UNITED STATES PATENTS

| | | |
|---|---|---|
| 2,259,636 | Harrington | Oct. 21, 1941 |
| 2,410,869 | Ernst | Nov. 12, 1946 |